United States Patent [19]
Tanimoto et al.

[11] Patent Number: 4,788,866
[45] Date of Patent: Dec. 6, 1988

[54] METHOD AND APPARATUS FOR VISUALIZING ULTRASONIC WAVES IN LIQUID-SOLID SYSTEMS

[75] Inventors: Kenichi Tanimoto; Kazuhiro Date, both of Higashi, Japan

[73] Assignee: Doryokuro Kakunenryo Kaihatsu Jigyodan, Tokyo, Japan

[21] Appl. No.: 102,230

[22] Filed: Sep. 29, 1987

[30] Foreign Application Priority Data

Oct. 8, 1986 [JP] Japan .................................. 61-239689

[51] Int. Cl.$^4$ ............................................ G01N 29/04
[52] U.S. Cl. ...................................................... 73/606
[58] Field of Search ........................... 73/606, 608, 601

[56] References Cited

PUBLICATIONS

V. M. Baborovsky, "Visualisation of Ultrasound in Solids", *Physics in Technology*, vol. 10, No. 4 (July 1979), pp. 171–177.

K. G. Hall, "Visualization Techniques for the Study of Ultrasonic Wave Propagation in the Railway Industry," *Materials Evaluation*, 42 (June 1984), pp. 922–929, 933.

Y. Tomita and A. Shima; "Mechanisms of Impulsive Pressure Generation and Damage Pit Formation by Bubble Collapse;" *J. Fluid Mech.* (1986), vol. 169, pp. 535–564.

D. M. Marsh; "Methods of Visualizing Ultrasound;" T. I. Research Laboratories, Hinxton Hall, Saffron Walden, Essex, Eng. pp. 317–367.

C. F. Ying, S. Y. Zhang & J. Z. Shen; "Scattering of Ultrasound in Solids as Visualized by the Photoelastic Technique;" *Journal of Nondestructive Evaluation*, vol. 4, No. 2, 1984; pp. 65–73.

J. Wiklund, "A Schlieren Study of the Generation of Different Types of Ultrasonic Waves in Thin Plates," *NDT International*, Aug. 1977; pp. 187–192.

K. G. Hall, "Railway Applications of Ultrasonic Wave Visualisation Techniques," *British Journal of NDT*; Mar. 1984; pp. 162–171.

*Primary Examiner*—John Chapman
*Attorney, Agent, or Firm*—Armstrong, Nikaido, Marmelstein & Kubovcik

[57] ABSTRACT

The sound field of ultrasonic pulses emitted in a liquid-solid system is irradiated with polarized light, and the ultrasonic pulses in the liquid and in the solid are visualized simultaneously by detecting deflected light arising from a change in refractive index of the liquid caused by presence of the ultrasonic pulses, and polarized light arising from the birefringence in the solid caused by presence of the ultrasonic pulses. By quantitatively measuring the sound field, waveform, etc. of the ultrasonic pulses from an ultrasonic probe in the liquid by the schlieren method and in the solid by the photoelastic method simultaneously, it is possible to visualize the ultrasonic pulses in the liquid and solid at the same time. This enables ready measurement of the direction of emission of the ultrasonic pulses from the probe, the ultrasonic wavelength, the propagation velocity, etc., thus making it possible to perform a comprehensive performance evaluation and examination of sound field for various types of probes, inclusive of the water-submersible type.

10 Claims, 10 Drawing Sheets

EMITTED PULSE

PULSE IMPINGING UPON SOLID SURFACE

REFLECTED PULSE

NO PULSE VISIBLE

METHOD AND APPARATUS FOR VISUALIZING ULTRASONIC WAVES IN LIQUID-SOLID SYSTEMS

BACKGROUND OF THE INVENTION

This invention relates to a method and apparatus for visualizing the behavior of pressure waves in a liquid-solid system. More particularly, the invention relates to a method and apparatus for visualizing the behavior of ultrasonic waves in a liquid and solid simultaneously for the purpose of flaw detection and the like.

A high degree of safety and reliability is required in the equipment and supporting structures of atomic power stations, thermal power stations and chemical plants, the various mechanical equipment in aircraft and automobiles, the steel-frame construction of buildings and bridges, ceramic materials and the like. To this end, the soundness of equipment and materials is verified periodically by a variety of non-destructive tests, one of which is an ultrasonic test for flaw detection.

FIGS. 9(A) and 9(B) are views illustrating a conventional method of performing an ultrasonic test for flaw detection, in which FIG. 9(A) shows a method of flaw detection by direct contact and 9(B) a method of flaw detection by submersion in water. Numeral 21 denotes an ultrasonic direct contact-type probe, 22 a sample undergoing the test, 23 a flaw, 24 an ultrasonic submersible-type probe, and 25 water.

In the conventional method of direct-contact flaw detection shown in FIG. 9(A), the ultrasonic probe 21 (hereinafter referred to simply as a "probe") is brought into direct contact with the sample 22 to examine the sample for the flaw 23. In the conventional method of submersion-type flaw detection illustrated in FIG. 9(B), the probe 24 irradiates the sample 22 with ultrasonic pulses (hereinafter referred to simply as "pulses") through the medium of the water 25.

The direct-contact flaw detection method using the direct contact-type probe 21 is used for detecting flaws in equipment and materials having a comparatively simple shape, such as flat plates, pipes and the like. The submersion-type flaw detection method employing the submersible probe 24 is in wide use since it is applicable to equipment and materials having a complicated shape and excels in terms of probe scanning capability, stability of coupling characteristics and the like.

The sound field and pulse waveform of ultrasonic pulses emitted by a probe can be examined by (1) measuring the waves reflected from a transverse hole, longitudinal hole or slit-type flaw actually formed in a sample, or from minute reflectors such as spheres immersed in water, or (2) by using a solid model and visualizing the ultrasonic pulses that propagate through the model. The latter method enables the pulse waveform and sound pressure to be measured in detail. In order to visualize the pulses, use is made of the schlieren method, in which the light source is a strobe having a short flash time, or a photoelastic testing method.

Though the method using the minute reflectors is advantageous in that measurements can be mde with ease using a material the same as that of the sample, a drawback is that the reflector has a marked frequency characteristic with respect to ultrasonic waves so that the reflected waveform is changed by the input waveform. This makes detailed measurement impossible.

The schlieren method provides a high visualization sensitivity with respect to pulses in water and makes detailed analysis possible. However, the method is difficult to apply in solids since sensitivity is poor in such a medium.

The photoelastic testing method provides highly sensitive visualization only for pulses in solids and makes quantitative evaluation possible. However, since shearing stresses do not act in water, pulses in water cannot be visualized in theory.

Accordingly, if sound field measurement of pulses from a submersible probe is to be evaluated quantitatively, the schlieren method enables visualization only of the pulses that propagate through the water and not the solid, whereas the photoelastic testing method is capable of visualizing only the pulses that propagate through the solid and not the water. Thus, overall evaluation of pulses in both water and solid is not possible.

It is necessary to ensure uniformity of the quantitative results (i.e. echo height, beam path, etc.) of flaw detection using a probe, where uniformity means the ability to make the same judgements with regard to the same flaw regardless of the probe used, and to decide optimum flaw detection conditions, such as probe selection (frequency, angle of refraction, etc.), placement of the probe and scanning pitch, when actually performing a flaw detection test. In order to obtain uniformity of quantitative results and decide optimum flaw detection conditions, the sound field characteristics of the probe and the pulse waveform are among the most important factors to be decided.

Accordingly, in order to perform an overall performance evaluation and examination of the sound field and pulse waveform of ultrasonic pulses from various types of probes inclusive of the submersible type, there is need for development of a technique that will enable the features of both the schlieren method and photoelastic testing method to be applied simultaneously.

SUMMARY OF THE INVENTION

An object of the present invention is to provide a method and apparatus for ultrasonic visualization in a liquid-solid system that makes it possible to visualize ultrasonic pulses in a liquid and solid simultaneously and to perform an overall performance evaluation and examination of sound field and pulse waveform of various types of probes inclusive of the water-submersible type.

In accordance with the invention, a method of visualizing ultrasonic waves in a liquid-solid system comprises steps of irradiating a sound field of ultrasonic pulses emitted in a liquid-solid system with polarized light, and visualizing the sound field due to utrasonic waves in the liquid and in the solid by detecting deflected light arising from a change in refractive index of the liquid caused by presence of the ultrasonic pulses, and polarized light arising from birefringence in the solid caused by presence of the ultrasonic pulses.

In accordance with the invention, an apparatus for visualizing ultrasonic waves in a liquid-solid system comprises a first optical system having a polarizing plate upon which light from a strobe light source is incident, opposing second and third optical systems upon one of which polarized light from the first optical system is incident, observation means arranged between the second and third optical systems for internally accommodating a liquid and a solid and for being irradiated with ultrasonic pulses from an ultrasonic probe, a knife edge comprising a polarizing plate arranged in perpendicular relation to the polarizing plate of the first optical system at a position at which light which has passed through the observing means is imaged by the second or third optical system, and a fourth optical system for visualizing light which has passed through the knife edge, the polarizing plate constituting the knife edge being adapted to block the image of the strobe light source in a state where the observation means is not being irradiated with ultrasonic pulses.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2(A), 2(B) illustrate the basic construction of a knife edge in the apparatus of FIG. 1, in which FIG. 2(A) is a view of a rectilinear arrangement and FIG. 2(B) is a view of a circular arrangement;

FIGS. 9(A), and 9(B) illustrate an ultrasonic flaw detection method according to the prior art, in which FIG. 9(A) is a view showing the direct contact-type flaw detection method, and FIG. 9(B) is a view showing the water submersion-type method of flaw detection.

DESCRIPTION OF THE PREFERRED EMBODIMENT

An embodiment of the present invention will now be described with reference to the drawings.

Figure 1:
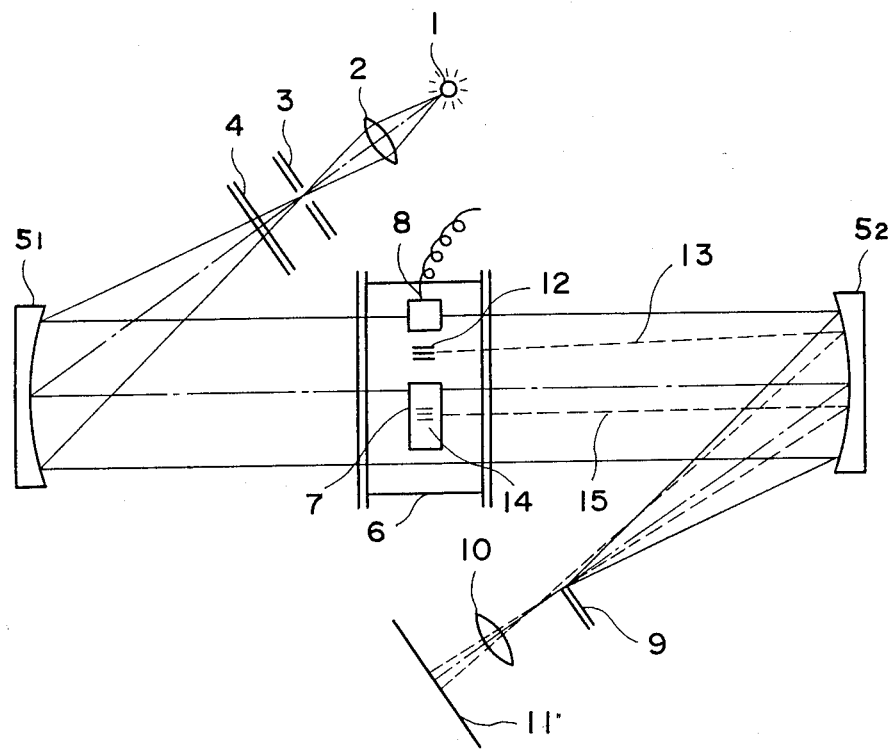
FIG. 1 is a schematic view illustrating the basic construction of an apparatus for visualizing ultrasonic waves in a liquid-solid system according to the present invention.

FIG. 1 is a schematic view illustrating the basic construction of an apparatus for visualizing ultrasonic waves in a liquid-solid system according to the present invention, and FIGS. 2(A), 2(B) illustrate the basic construction of a knife edge in the apparatus of FIG. 1, in which FIG. 2(A) is a view of a rectilinear arrangement and FIG. 2(B) is a view of a circular arrangement. The apparatus includes a strobe light source 1, a condenser lens 2, a pin hole 3, a polarizing plate 4, opposing concave mirrors $5_1$, $5_2$, an observing station 6, a glass specimen 7, a ultrasonic probe 8, a knife edge 9 comprising a polarizing plate 9A and a polarizing plate 9B, the latter of which is for adjustment of amount of light, a camera lens 10, and a screen 11. Numerals 12, 14 denote utrasonic pulses, 13 deflected light, and 15 polarized light.

Light emitted by the strobe light source 1 is imaged by the condenser lens 2 at the position of the pin hole 3 arranged at the focal point of the lens 2. The light passing through the pin hole 3 is polarized by the polarizing plate 4 before impinging upon the left concave mirror $5_1$ of the pair of opposing concave mirrors $5_1$, $5_2$. The incident light is converted into parallel light by the concave mirror $5_1$, as indicated by the solid lines, which parallel light passes through the observing station 6 to be imaged at the location of the knife edge 9 by the other concave mirror $5_2$.

In the absence of a material in the observing station that will undergo a change in refractive index caused by ultrasonic pulses, the image of the pin hole 3 will, in accordance with the schlieren method, be imaged near the end face of the knife edge 9. Here the light is blocked by the knife edge and therefore does not reach the screen 11 directly. Accordingly, in an ordinary apparatus using the schlieren method, the knife edge 9 is fabricated from a metal plate or the like which will not transmit light.

If the observing station 6 has a portion whose refractive index changes when irradiated with ultrasonic pulses from the probe 8, the light from mirror $5_1$ is refracted in the observating station 6, as indicated by the dashed line 13. As a result, some of the light collected at the location of the pin hole image on knife edge 9 lies beyond the knife edge and reaches the screen 11. Thus, the pulses projected into the observing station are converted into a bright image and can therefore be visualized.

In theory, one would expect visualization of ultrasonic pulses that are present not only in water but also in a solid, such as the glass sample 7 through which the ultrasonic pulses 14 propagate. In actuality, however, the change in refractive index caused in a solid by application of ultrasonic pulses is very small, so that the light propagates through the observing station 6 rectilinearly with almost no deflection, as indicated by the dashed line 15. As a result, the ultrasonic pulses in the solid cannot be visualized with the same sensitivity as the pulses in water. In actual practice, therefore, simultaneous visualization of the pulses in water and in the solid is not possible.

Figure 2:
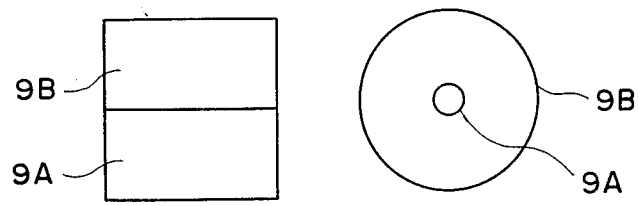

Accordingly, consider the case shown in FIG. 1, where the polarizing plate 4 is situated behind the pin hole 3 so that the light incident upon the observing station 6 is polarized. This arrangement has no influence whatsoever upon application of the schlieren method, so that the principle of this method can be applied as is. Furthermore, by constructing the knife edge 9 of polarizing plates, as shown in FIG. 2, and arranging the polarizing plates at right angles to the entrant polarized light (which state is referred to as the "dark field" state in the photoelastic testing method), the entrant light can be blocked by the polarizing plate 9A when nothing is present in the observing station 6. When polarized light from the polarizing plate 4 is deflected by a change in the refractive index of water contained in the observing station, the light can be visualized upon passing through the polarizing plate 9B, which is for adjusting the amount of light. The polarizing plate 9B functions as a filter for maintaining balance between luminance of the visualized image obtained by the schlieren method and luminance of the visualized image obtained by the photoelastic testing method.

If ultrasonic pulses propagate through the specimen 7, the light passing through the specimen 7 undergoes but a small change in refractive index, as mentioned above, so that the light collects on the polarizing plate 9A of the knife edge 9. However, since the plane of polarization of the polarized light incident upon the specimen 7 changes in proportion to the sound pressure of the pulses due to the birefringence, or photoelastic effect, exhibited by of the specimen to which the pulses are applied, the polarized light is capable of passing through the polarizing plate 9A, thus making it possible to visualize the pulses in the glass specimen 7 as well.

Figure 1A:
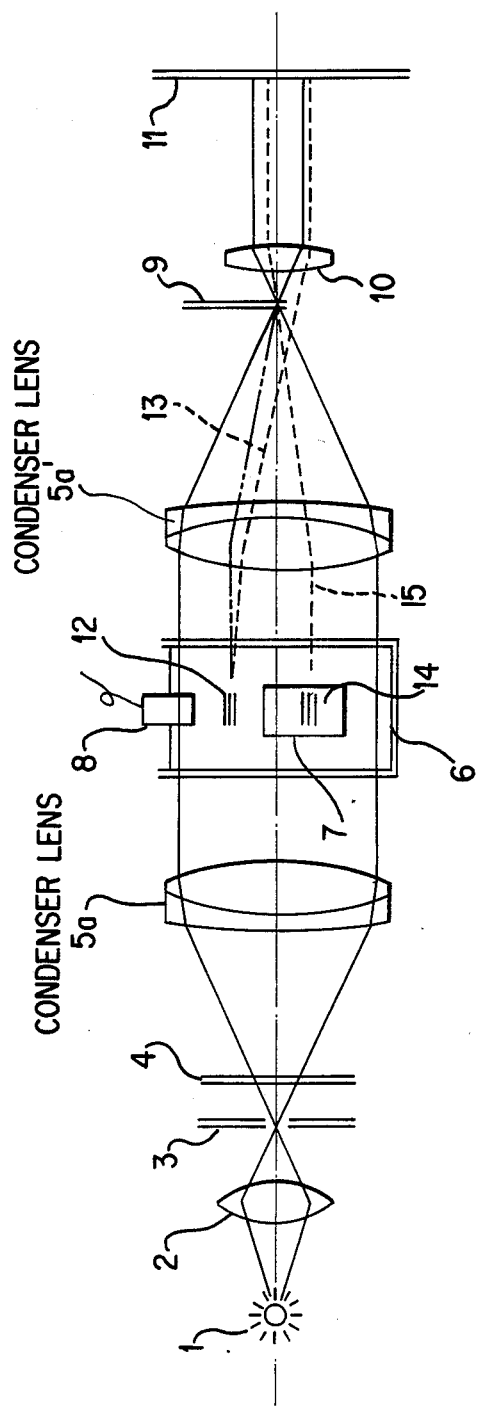
FIGS. 1(A), 1(B) and 1(C) are schematic views of second, third, and fourth embodiments of the present invention.
Figure 1B:
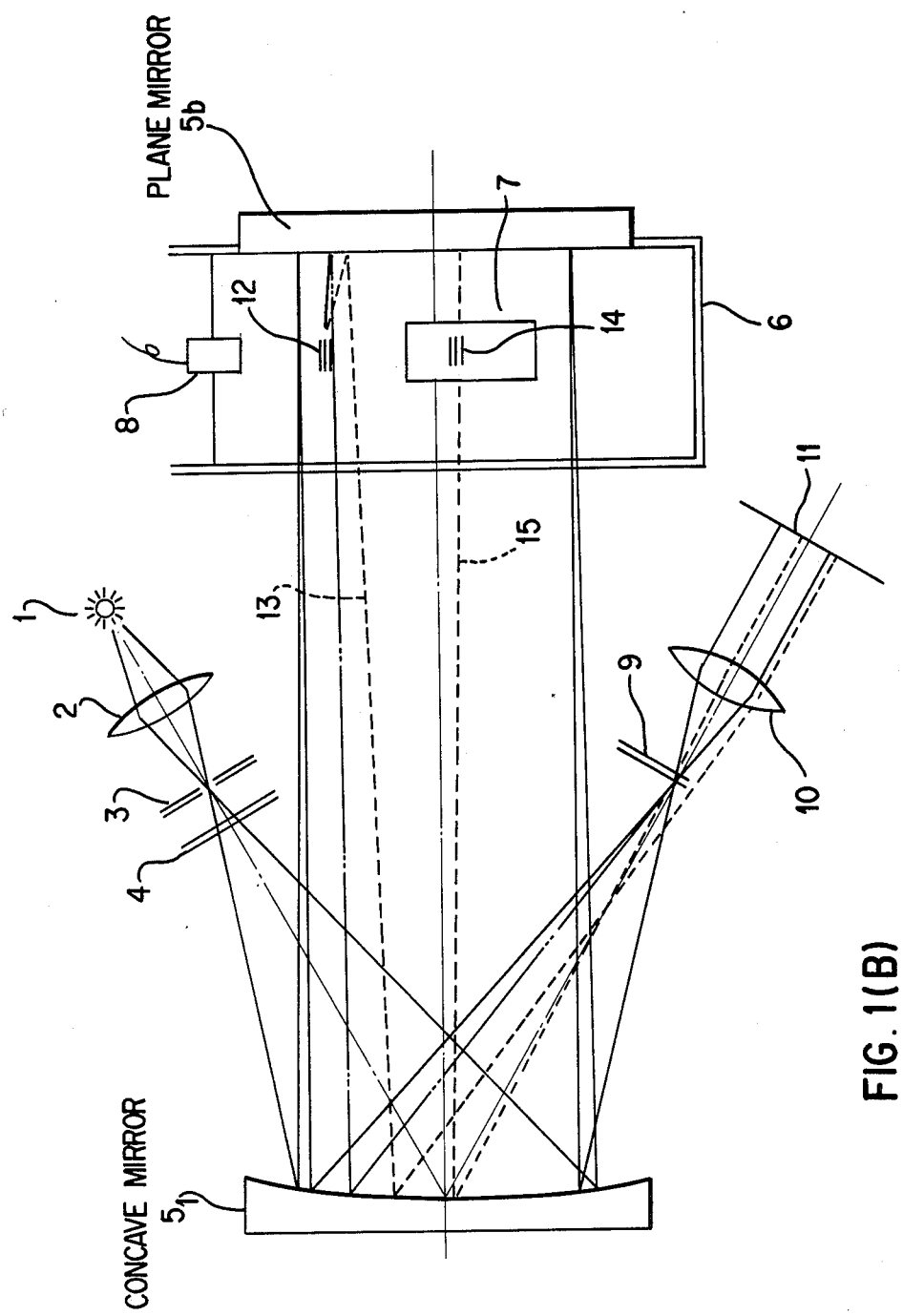
Figure 1C:
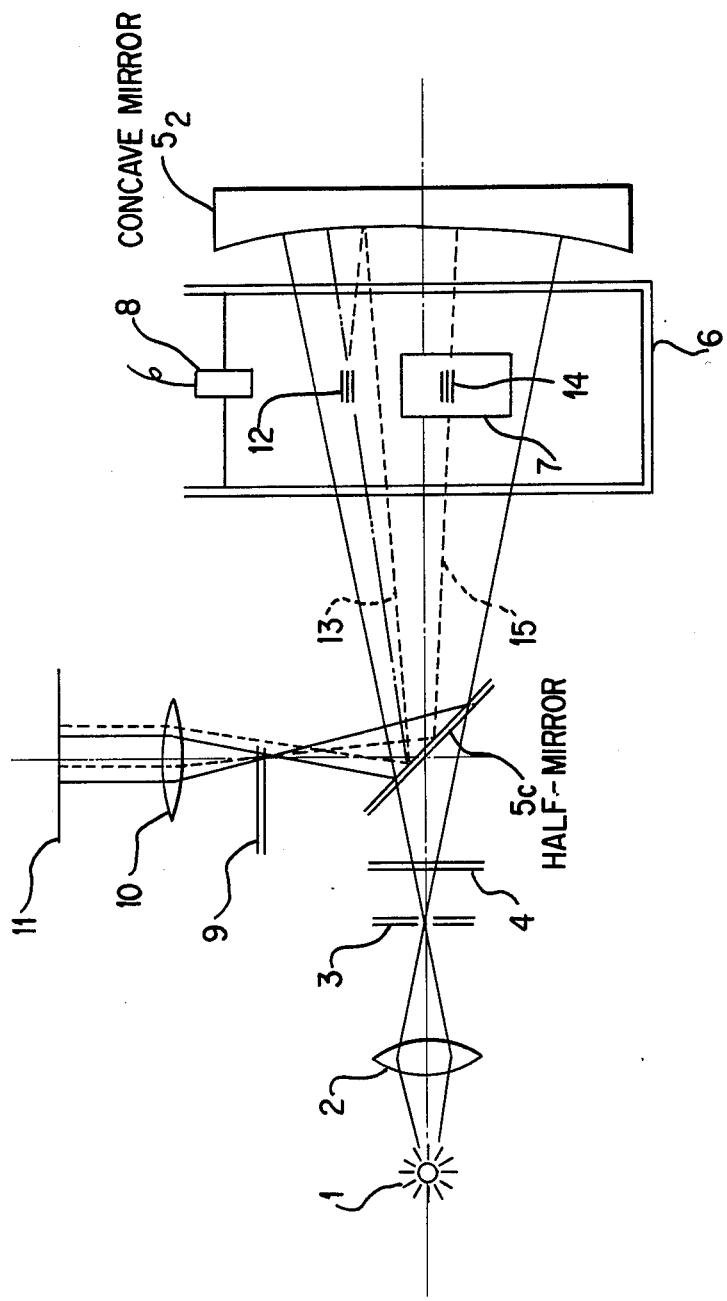

FIG. 1(A) is similar to FIG. 1 wherein opposing concave mirrors $5_1$, $5_2$ are replaced with opposing condenser lenses $5a$ and $5a'$. The remaining elements are the same as in FIG. 1. Likewise, FIG. 1(B) is similar to FIG. 1 wherein concave mirror $5_2$ is replaced with plane mirror $5b$. The remaining elements are the same as in FIG. 1. Further, FIG. 1(C) is also similar to FIG. 1, wherein concave mirror $5_1$ is replaced with half-mirror $5c$. The remaining elements are the same as in FIG. 1.

Observation of ultrasonic pulses in accordance with an embodiment of the apparatus of the invention will now be described.

Figure 3:
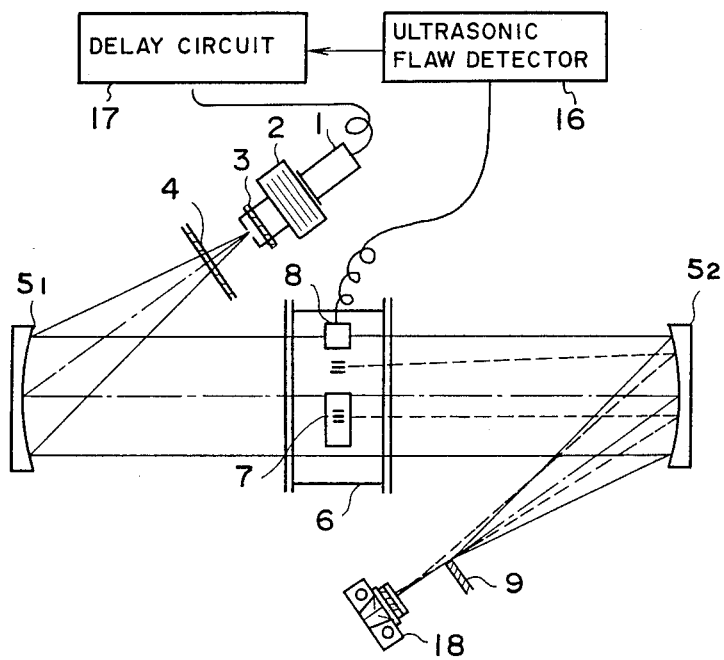
FIG. 3 is a schematic view illustrating another embodiment of an apparatus for visualizing ultrasonic waves in a liquid-solid system in accordance with the invention applied to observation of ultrasonic pulses.
Figure 4:
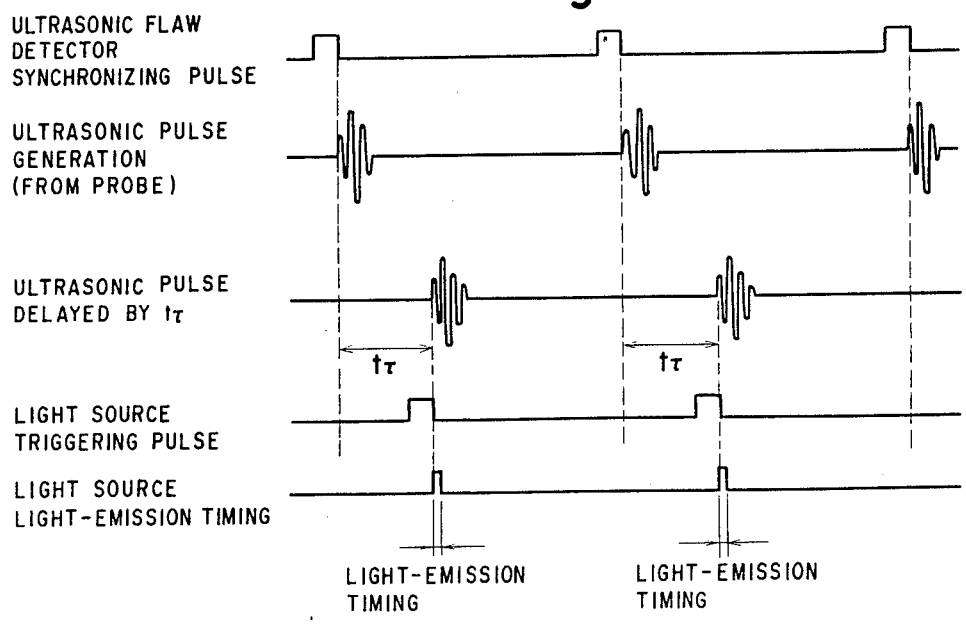
FIG. 4 is a waveform diagram of various signals associated with the apparatus of FIG. 3.

FIG. 3 is a view illustrating an embodiment of an apparatus for visualizing ultrasonic waves in a liquid-solid system in accordance with the invention applied to observation of ultrasonic pulses, and FIG. 4 is a waveform diagram of various signals associated with the apparatus of FIG. 3. The apparatus of the schlieren method, which forms the basic arrangement, is similar to that shown in FIG. 1, and portions corresponding to those illustrated in FIG. 1 are designated by like reference characters. In FIG. 3, numeral 16 denotes an ultrasonic flaw detector, 17 a delay circuit, and 18 a camera.

The range of observation in FIG. 3 using the two opposed concave mirrors $5_1$, $5_2$ is 250 mm, and the focal distance is 2.5 m. The light source 1 is a strobe light source having a flash time of 180 nsec and a rise time of about 50 nsec. Light emission timing is synchronized to pulse emission timing by a synchronizing signal from the ultrasonic flaw detector 16. The observing station 6 constituted by a water tank having an observation window with a diameter of 250 mm is filled with water, in which the glass specimen 7 is submerged. The glass specimen 7 is a 100×100 mm square of pyrex having a thickness of 20 mm. The pyrex serves as a solid model material in which the velocity of light is 5490 m/sec for longitudinal waves and 3420 m/sec for transverse waves. As this closely approximates the figures for steel (5900 m/sec and 3230 m/sec), the pyrex specimen makes it possible to simulate an actual ultrasonic flaw detection test satisfactorily. The ultrasonic probe 8 is one readily available on the market and has an oscillation frequency of 2 MHz and an oscillator diameter of 20 mm. The probe is connected to the ultrasonic flaw detector 16 and generates ultrasonic pulses. The knife edge 9 used in the rectilinear one shown in FIG. 2(A). The polarizing plate 9B is offset by about 20° from the polarizing angle of polarizing plate 9A to reduce the luminance of the image, thereby maintaining balance between the luminance of the visualized image produced by the schlieren method and that produced by the photoelastic testing method. The visualized image is photographed by the camera 18.

After an ultrasonic pulse is emitted, the light source 1 emits light following a time delay of $t_\tau$ introduced by the delay circuit 17. Thus, in photographing a visualized image of an ultrasonic pulse, the ultrasonic pulse observed is that after the time delay $t_\tau$. Accordingly, if the time delay $t_\tau$ is varied, ultrasonic pulse behavior can be visualized.

Figure 5:
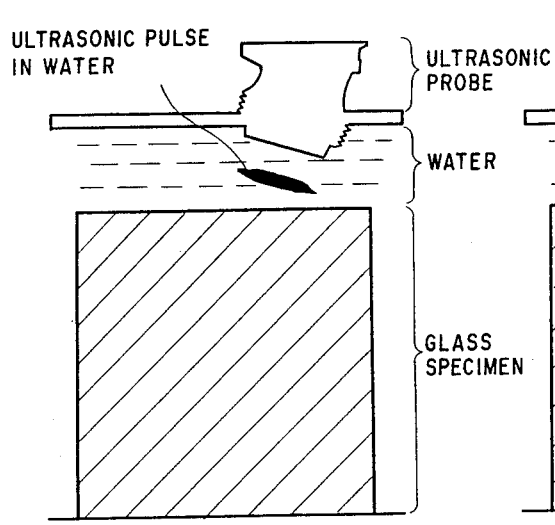
FIGS. 5(A), 5(B), 5(C) are views for describing ultrasonic pulses observed in accordance with the invention.
Figure 5:
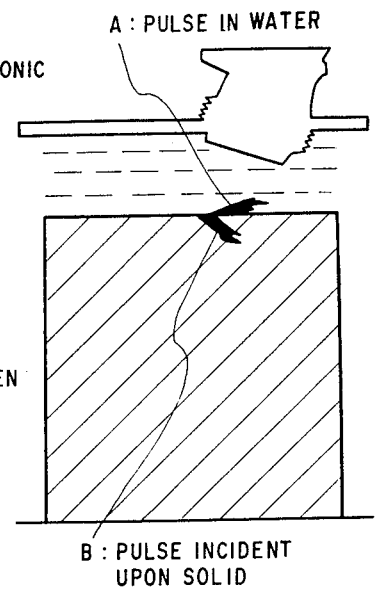
Figure 5:
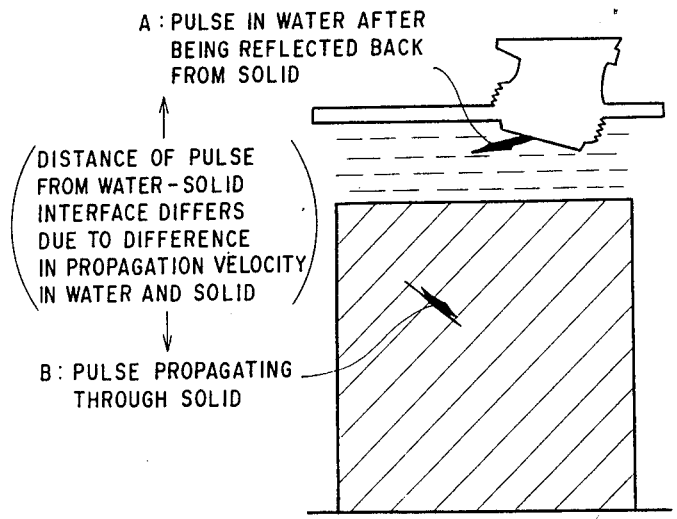

FIGS. 5(A), 5(B), 5(C) are views for describing the visualization of ultrasonic pulses in water and in a solid in accordance with the invention. The behavior of an ultrasonic pulse projected into water is observed in FIG. 5(A). FIG. 5(B) shows that a portion of the ultrasonic pulse is reflected as a pulse A at the surface of the solid, and that a portion is refracted and enters the solid as a pulse B. FIG. 5(C) shows pulse A in the water following its reflection at the surface of the solid, as well as pulse B in the solid. It will thus be appreciated that the pulse in the water and the pulse in the glass specimen can be visualized simultaneously. Since the velocity of sound in the solid is about twice that in water, the pulse B propagates from the water-solid interface about twice as fast as the pulse A, as will be understood from FIG. 5(C). Also, pulse wavelength, propagation direction and propagation velocity can readily be determined from the images of the pulses.

Figure 6:
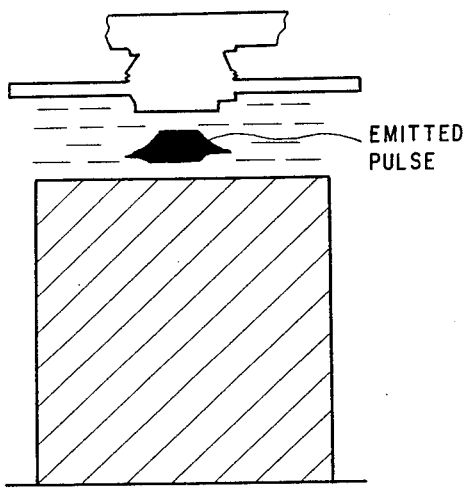
FIGS. 6(A), 6(B), 6(C) are views for describing ultrasonic pulses in water observed in accordance with the schlieren method.
Figure 6:
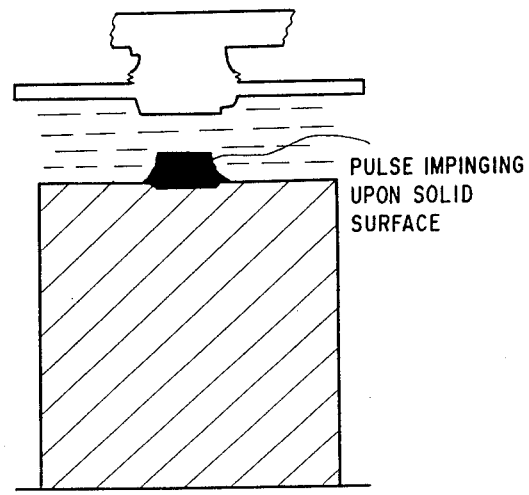
Figure 6:
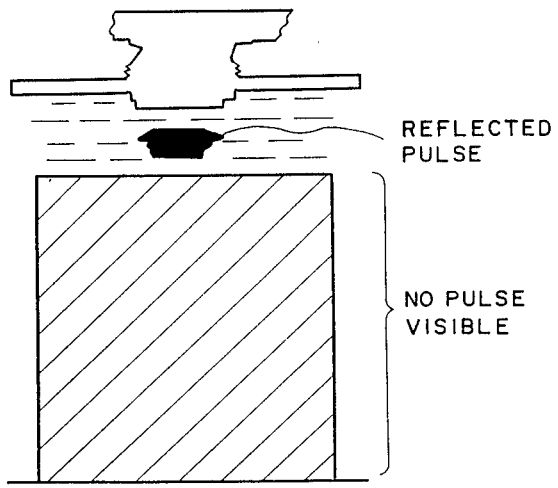

FIGS. 6(A), 6(B), 6(C) are views useful in describing the visualization of the abovementioned ultrasonic pulses in accordance with the ordinary schlieren method. FIG. 6(A) illustrates the ultrasonic pulse after its emission from the probe, FIG. 6(B) shows the pulse when it strikes the surface of the solid, and FIG. 6(C) shows the pulse after its reflection. Note that while the image of the pulse in water can be visualized and observed, visualization of the pulse in the glass specimen is impossible.

Figure 7:
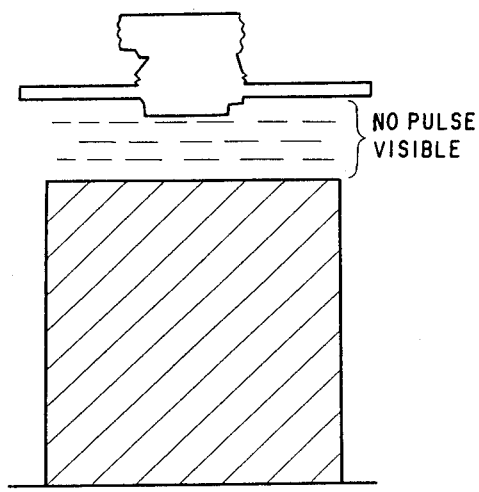
FIGS. 7(A), 7(B) are views for describing ultrasonic pulses in a solid observed in accordance with the photoelastic method.
Figure 7:
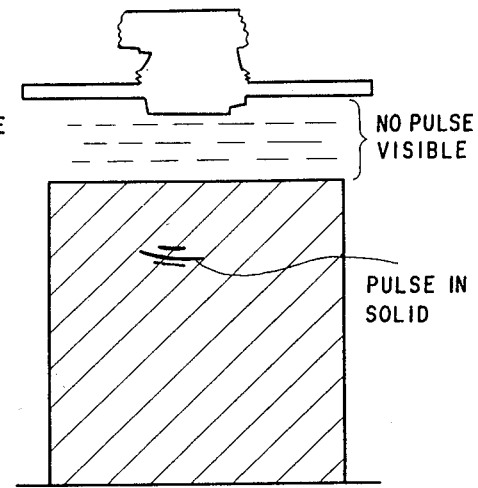

FIGS. 7(A), 7(B) are views for describing visualization of the pulses in accordance with the photoelastic testing method. FIG. 7(A) shows the state after emission of the ultrasonic pulse from the probe, and FIG. 7(B) illustrates the pulse after it enters the solid. It will appreciated that the pulse in the glass specimen can be visualized and observed but not the pulse in the water.

Figure 8:
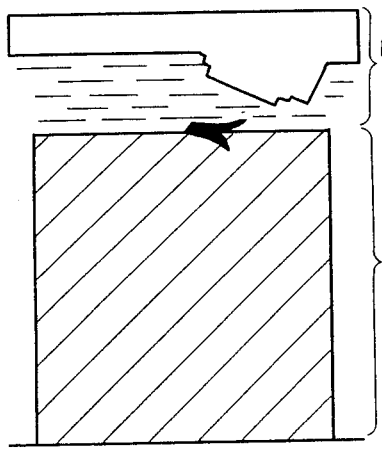
FIGS. 8(A), 8(B), 8(C) are views for describing ultrasonic pulses at a water-solid interface based on the present invention, the schlieren method and the photoelastic method, respectively.
Figure 8:
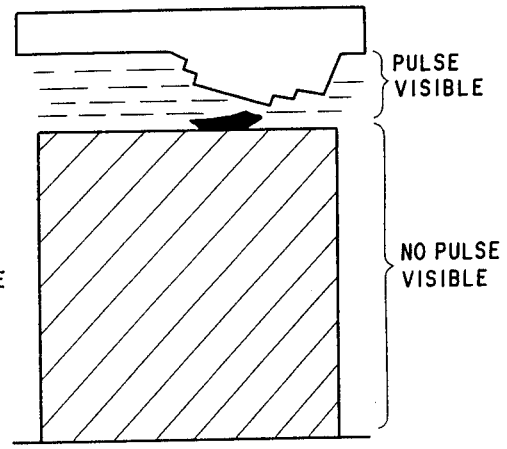
Figure 8:
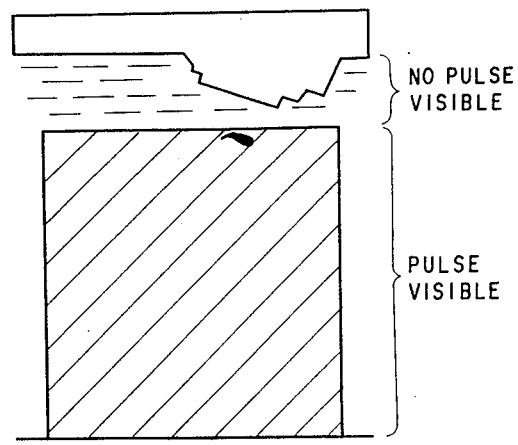
Figure 9:
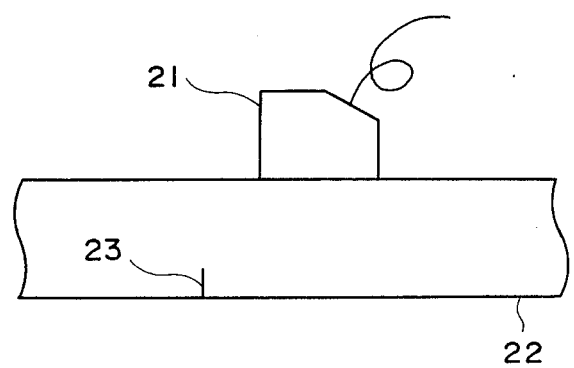
Figure 9:
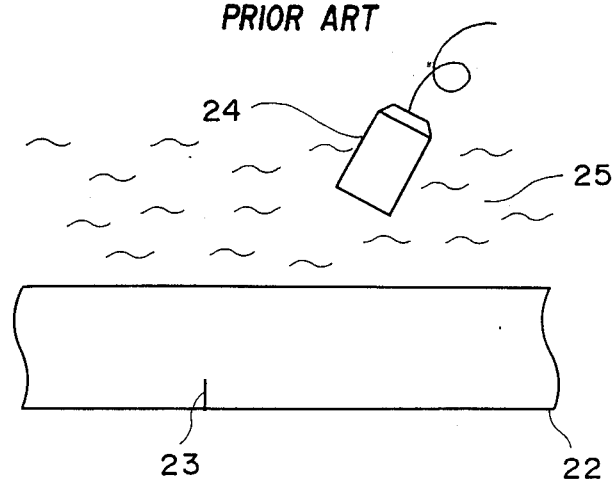

FIGS. 8(A), (B), (C) are views for describing ultrasonic pulses at the water-solid interface based on the method of the present invention, the schlieren method and the photoelastic method, respectively.

In the above-described embodiment, the observing station 6 is flanked by the two opposing concave mirrors $5_1$, $5_2$. However, the invention is not limited to such an arrangement. For example, an optical system can be adopted in which the observing station is flanked by two opposing condenser lenses, polarized parallel light which has passed through one of these lenses is made to fall upon the observing station, and the light which exits from the observing station is passed through the other lens to obtain a visualized image; in which the observing station is flanked by a plane mirror and concave mirror arranged to oppose each other, polarized light is made to fall upon the concave mirror, the light reflected from the mirror is made to fall upon the observing station, the light which exits from the observing station is reflected by the plane mirror, and this reflected light is reflected again by the concave mirror to obtain a visualized image; or in which the observing station is flanked by a half-mirror and a concave mirror arranged to oppose each other, polarized light which has passed through the half-mirror is made to fall upon the observing station, and the light which exits from the observing station is reflected by the concave mirror to obtain a visualized image via the half mirror.

Thus, in accordance with the present invention, the sound field of an ultrasonic pulse in water and in a solid can be imaged and observed simultaneously. In the prior art, on the other hand, an apparatus using the schlieren method can be applied to visualization of the pulse sound field in water only, while an apparatus using the photoelastic testing method is limited to visualization of the pulse sound field in a solid only. Since the schlieren method and photoelastic testing method are practiced using separate optical system, a problem is encountered when an attempt is made to evaluate a submersible-type probe. Specifically, since an overall image of a pulse in both water and solid cannot be observed simultaneously, a detailed analysis of the pulse is difficult to perform. With the method of the present invention, however, the behavior of a pulse in both the liquid and solid can be observed simultaneously, thus making it possible to measure and quantitatively evaluate sound field and pulse waveform for various types of probes, inclusive of the submersible and direct contact types. Accordingly, the invention can be utilized to carry out a performance evaluation and examination of probes, select a probe best suited for a particular type of flaw detection, decide the method of probe arrangement and scanning pitch, and develop novel probes. The invention also contributes to improved precision and enhanced reliability of ultrasonic flaw detection.

Further, since the invention makes possible the simultaneous implementation of the schlieren method for analyzing the flow of a liquid or gas and the photoelastic testing method for stress analysis in a solid, the invention can be utilized to measure a force from a liquid acting upon a blade, turbine, water wheel or the like. The invention can thus play a role in the designing of such devices.

The detailed analyses of waveform, sound pressure distribution, pulse propagation direction, wave type and the like based on the visualized image can be carried just as heretofore by applying the principles of the schlieren method and photoelastic testing method.

As many apparently widely different embodiments of the present invention can be made without departing from the spirit and scope thereof, it is to be understood that the invention is not limited to the specific embodiments thereof except as defined in the appended claims.

We claim:

1. A method of visualizing ultrasonic waves in a liquid-solid system, comprising the steps of:
    emitting a sound field of ultrasonic pulses in a liquid-solid system;
    irradiating the sound field with polarized light;
    detecting deflected light arising from a change in refractive index of the liquid caused by presence of the ultrasonic pulses;
    simultaneously detecting polarized light arising from birefringence in the solid caused by presence of the ultrasonic pulses; and
    visualizing the sound field due to ultrasonic waves in the liquid and in the solid by detection of the deflected light and polarized light.

2. An apparatus for visualizing ultrasonic waves in a liquid-solid system, comprising:
    a first optical system having a polarizing plate upon which light from a strobe light source is incident;
    opposing second and third optical systems upon one of which polarized light from said first optical source is incident;
    observation means arranged between said second and third optical systems for internally accommodating a liquid and a solid and for being irradiated with ultrasonic pulses from an ultrasonic probe;
    a knife edge comprising a polarizing plate arranged in perpendicular relation to the polarizing plate of said first optical system at a position at which light which has passed through said observation means is imaged by said second or third optical system; and
    a fourth optical system for visualizing light which has passed said knife edge;
    the polarizing plate constituting said knife edge being adapted to block the image of the strobe light source when said observation means is not being irradiated with ultrasonic pulses.

3. The apparatus according to claim 2, wherein each of said second and third optical systems comprises a concave mirror.

4. The apparatus according to claim 2, wherein each of said second and third optical systems comprises a condenser lens.

5. The apparatus according to claim 2, wherein said second optical system comprises a concave mirror and said third optical system comprises a plane mirror.

6. The apparatus according to claim 2, wherein said second optical system comprises a half-mirror and said third optical system comprises a concave mirror.

7. The apparatus according to claim 2, including means for synchronizing timing at which light is emitted from said strobe light source and timing at which ultrasonic pulses are emitted from said ultrasonic probe.

8. The apparatus according to claim 7, wherein the timing at which ultrasonic pulses are emitted from said ultrasonic probe is delayed with respect to the timing at which light is emitted from said strobe light source, and the time delay is variable.

9. The apparatus according to claim 2, wherein said knife edge is provided with a filter for adjusting luminance of deflected light which has passed through the liquid.

10. The apparatus according to claim 9, wherein said filter comprises a polarizing plate.

* * * * *